US008533786B2

(12) United States Patent  (10) Patent No.: US 8,533,786 B2
Chabbewal et al.  (45) Date of Patent: Sep. 10, 2013

(54) METHOD AND APPARATUS FOR PROTECTING AGAINST ATTACKS FROM OUTSIDE CONTENT

(75) Inventors: Harsimranjit Singh Chabbewal, San Francisco, CO (US); Alan Vangpat, Pittsburgh, PA (US); William Charles Mortimore, Jr., San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 95 days.

(21) Appl. No.: 13/090,095

(22) Filed: Apr. 19, 2011

(65) Prior Publication Data

US 2012/0272292 A1  Oct. 25, 2012

Related U.S. Application Data

(60) Provisional application No. 61/418,900, filed on Dec. 2, 2010.

(51) Int. Cl.
*G06F 21/00* (2006.01)
(52) U.S. Cl.
USPC ........ 726/4; 726/3; 726/5; 713/155; 709/229; 380/277; 705/76
(58) Field of Classification Search
USPC .......................................................... 726/3–4
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,199,113 B1 * | 3/2001 | Alegre et al. ................. | 709/229 |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec | |
| 6,324,693 B1 | 11/2001 | Brodersen et al. | |
| 6,336,137 B1 | 1/2002 | Lee et al. | |
| D454,139 S | 3/2002 | Feldcamp | |

(Continued)

*Primary Examiner* — Morshed Mehedi
(74) *Attorney, Agent, or Firm* — Blakely Sokoloff Taylor & Zafman LLP (57) ABSTRACT

A method and apparatus for protecting against attacks from outside content is described. In one example, a request is received from a user to access content from a second domain. An active session for the user with the second domain is searched for. If no active session is found, then an active session with a related first domain is searched for. If an active session is found with the first domain, then a session is established with the second domain based on the active session with the first domain. The requested content is then provided to the user based on the established session with the second domain.

17 Claims, 5 Drawing Sheets

(56) References Cited

U.S. PATENT DOCUMENTS

| | | |
|---|---|---|
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,748,420 B1 * | 6/2004 | Quatrano et al. ............. 709/205 |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,883,015 B1 * | 4/2005 | Geen et al. .................... 709/203 |
| 7,194,764 B2 * | 3/2007 | Martherus et al. ................. 726/8 |
| 7,340,411 B2 | 3/2008 | Cook |
| 7,620,655 B2 | 11/2009 | Larsson et al. |
| 8,010,783 B1 * | 8/2011 | Cahill ............................ 713/155 |
| 8,276,190 B1 * | 9/2012 | Chang et al. ...................... 726/3 |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0204148 A1 * | 9/2005 | Mayo et al. .................... 713/185 |
| 2006/0021019 A1 * | 1/2006 | Hinton et al. .................... 726/10 |
| 2007/0100981 A1 * | 5/2007 | Adamczyk et al. ............ 709/223 |
| 2008/0092224 A1 * | 4/2008 | Coulas et al. ..................... 726/12 |
| 2008/0320567 A1 * | 12/2008 | Shulman et al. .................. 726/4 |
| 2009/0019143 A1 * | 1/2009 | Frutiger ........................ 709/223 |
| 2009/0313261 A1 * | 12/2009 | Corella ............................ 707/10 |
| 2011/0023096 A1 * | 1/2011 | Xiao et al. ........................ 726/5 |
| 2011/0170455 A1 * | 7/2011 | Cai et al. ........................ 370/259 |

* cited by examiner

METHOD AND APPARATUS FOR PROTECTING AGAINST ATTACKS FROM OUTSIDE CONTENT

CLAIM OF PRIORITY

This application claims the benefit of U.S. Provisional Patent Application 61/418,990 entitled Method and System for Protecting Against Cross Site Scripting Attacks Originating from User Uploaded Content using a Child Sub-Session in a Separate Domain, by Harsimranjit Chabbewal et al., filed Dec. 2, 2010, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to protecting against attacks that come in the form of outside content, such as uploaded content in a database network system.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Domains that allow others to upload information can be subjected to many different forms of attack. One such attack is Cross Site Scripting (XSS) in which malicious code is introduced into a domain and from there can operate on a user's applications and an organization's data. Many web browsers reduce the impact and effectiveness of such attacks using a same-origin policy. The same-origin policy prevents attacks from a first domain from capturing valuable information from a second domain, such as a session cookie. With a session cookie, the XSS attack can gain access to the second domain and affect or obtain information in the second domain.

In some cases, network service providers use different domains for different services. However, authentication is not always maintained throughout all of the domains. For example, some network service providers serve user uploaded content, such as images and video, from a separate domain, but do so using the authentication from the primary domain. As a result, anyone with a link to content (for example, an image) on the content domain can access it without having to authenticate into the main domain or the content domain.

For example, in Facebook, as currently constituted, a friend's profile picture may be served from a separate domain, but to access the profile picture there is no authentication required. Authentication only protects the link. Anyone with a link to the picture URL can view it, even if they are not logged into Facebook and even if they do not have the right permissions. This type of structure allows an attack to harvest links in one domain and then use them in the other without any need to create a session or authenticate in either domain.

BRIEF SUMMARY

A method and apparatus for protecting against attacks from outside content is described. In one example, a request is received from a user to access content from a second domain. An active session for the user with the second domain is searched for. If no active session is found, then an active session with a related first domain is searched for. If an active session is found with the first domain, then a session is established with the second domain based on the active session with the first domain. The requested content is then provided to the user based on the established session with the second domain.

While one or more implementations and techniques are described with reference to an embodiment in which protecting against attacks from outside content is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Systems and methods are provided for protecting against attacks from outside content.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Cross Site Scripting (XSS) attacks can be frustrated by isolating user uploaded content to a separate content domain. This can prevent malicious code within the uploaded content from being introduced into applications and organization data in the primary domain. A web browser's same-origin policy can be used to prevent attacks from capturing the session cookie for a primary domain and applying it to a second domain without further authentication. At the same time, to present a seamless user experience between the domains, the primary domain session cookie can be used to authenticate the user to the content domain without requiring the user to log in separately into the content domain.

Additional measures can be used to prevent the separate content domain session from abuse. For example, permission checks can be performed to verify user access rights so that content is served only if the user has the requisite permissions and rights to view the content. For another example, a session cookie is preset on the separate content domain during the user's login.

These measures can prevent XSS attacks. Using authentication for the second domain, a user is prevented from viewing content on the second domain without permission. An authorized state in the primary domain can be securely propagated into the separate second domain using a sub-session. Finally, by performing the desired permission checks, content can be kept from a user or from an automated process even if the user is logged in to the main domain.

Process Description

In the described embodiment, a framework is used to facilitate serving user uploaded content from a separate content domain. However, the approaches described herein can be used to isolate any two or more domains from each other. Any one or more of these domains may allow for uploaded or other external content. Any one or more of these domains may have content that is to be kept secure from external attack.

In the described example, a first domain starts as a user landing domain. Login, access privileges, and secure data are all served from this domain. A second domain is used for a variety of other content including content that can be uploaded by users in a variety of formats. This content may contain hidden threats in the form of Cross Site Scripting (XSS) and other forms.

To allow this content in the secondary domain to be accessed while the user is logged into the primary domain, in one implementation, a special child sub-session is created for the secondary domain. The child sub-session is then used to authenticate the user's access to the secondary domain. In order to exploit the same origin policy of many web browsers, the sub session can be based on a sub-session cookie. The sub-session cookie can be preset when logging into the primary domain or it can be generated later when access to the secondary domain is requested.

In one example, a user logs in to a primary session on the primary domain. To enable access to the secondary domain, a session cookie is preset for a sub-session on the secondary domain during the user login using a special page. In this example, the secondary domain is a content domain and the special page may be called a "Content Door."

To accomplish the functions described herein a framework is established. The framework, based on authentication on the primary domain, establishes a new sub-session cookie for the content domain. This cookie will store a sub-session valid only for the content domain. In one example, the sub-session is a child of the session in the primary domain. For security, the sub-session may also be configured as short lived with a lifetime no longer than the session in the primary domain.

Considered in more detail, first the framework looks for an existing fresh sub-session cookie. Such a check can be triggered by an initial login to the primary domain or by an attempt by the user to access the content domain. If there is no sub-session cookie, or if the cookie is stale, then the framework generates a sub-session generation servlet to get a fresh sub-session based on the primary domain session. The servlet can be generated within an application that the user is using to access or log in to the primary domain. In one example, the servlet is generated by a salesforce.com app.

In one example, when a user makes a request for any user uploaded content on the content domain, the framework looks for a sub-session cookie scoped to the content domain. If a sub-session cookie does not already exist, then the framework calls out to the session generation servlet on the primary salesforce.com domain.

The servlet first determines whether a valid parent salesforce.com domain session exists. If there is no valid session in the primary domain, then the user can be asked to log in or the request can be rejected. If the login credentials are provided for the primary domain or if there is already a valid session, then the servlet gives the framework a new sub-session for the content domain. The application can then make use of this sub-session to authenticate the user on the content domain.

In one example, the user or a user application generates a GET request, the framework redirects this request over to the servlet. The redirect passes the current request URL as a parameter; the servlet can then redirect back to the original URL with a new content domain sub-session as an added parameter.

In another example, the user or a user application generates a POST request, in order to not lose posted form data. The framework returns a postback form that posts to the servlet, which uses a second postback form to repeat the original request.

In some of the examples described above, if the parent primary domain session is invalid or cannot be found, then the framework goes to the primary domain login page, requests that the user login, and uses a return URL to get the user back to the requested content. Once the framework has opened a child sub-session for the content or other secondary domain, the framework can store the session in any of a variety of different ways. In one example, the framework stores the session in a content domain sub-session cookie for future use. Using a cookie allows the framework to benefit from a browser's same origin policy if one is available.

Process Flow

Figure 1:
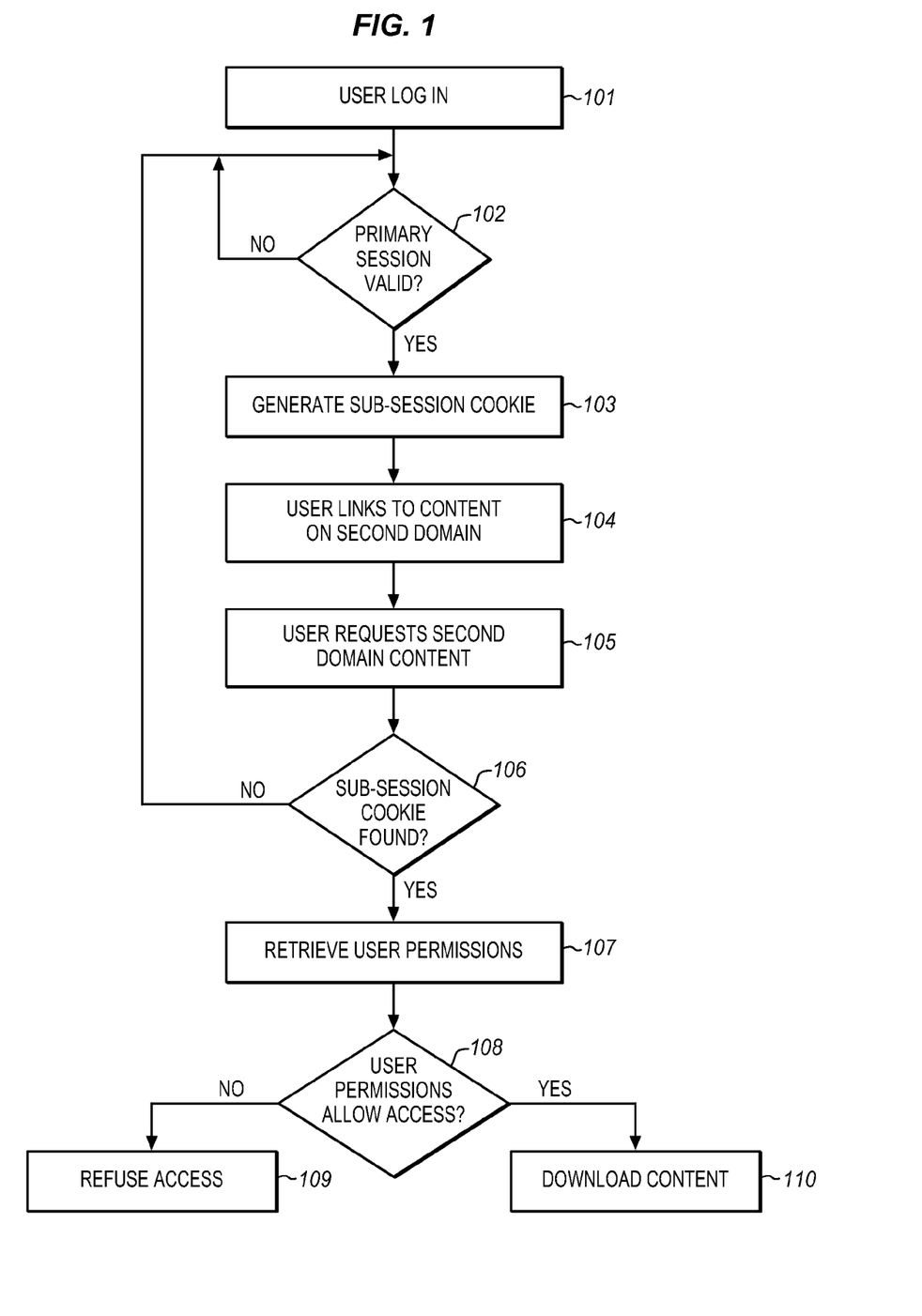
FIG. 1 is an operational flow diagram illustrating a high level overview of a technique for protecting against attacks from outside content in an embodiment.

The framework above can be described in the context of a process flow as shown in FIG. 1. At 101, a user logs in. This log in can be automated or manual. Instead of a login any other method of authentication can be used. After logging in, the framework can employ any of a variety of other processes to certify the authentication and to obtain privileges, rights, subscription status and any other information and validation that may be desired. In addition, a session is started based on the login. This may involve sending session cookies, establishing and applying security settings, configuring a VPN (Virtual Private Network) or any other operations that may be desired.

At 102, the framework calls a servlet to generate a sub-session cookie for a related secondary domain. Before generating the sub-session cookie, the servlet first checks to make sure that the primary session from 101 is valid. The primary session may be invalid because of an error in the login process or because of time elapsing between blocks 101 and 102. In that case, a valid session may have timed out. If there is no valid primary session then the user may be redirected to the log in screen or box. Alternatively, as with the original login, the login may be performed in another way.

If the session is valid, then at 103, the servlet generates the sub-session cookie. This is a cookie for a session that is dependent upon the primary session for its existence and for its authentication. The sub-session cookie cannot be generated without the primary session being valid.

At 104, the user finds a link to content on the second domain while on the primary domain. Accordingly, at 105, the user requests the second domain content by selecting a link or in any other way. In one example, the content on the second domain is selected automatically when the user selects content on the primary domain.

At 106, the framework checks for a sub-session cookie. This may be done each time the user requests content from the second domain. This ensures that the authentication is active and valid, improving security. Alternatively, some amount of content may be loaded or some timing may be allowed before the sub-session cookie is checked. A variety of different approaches may be applied depending on the particular implementation.

If a sub-session cookie is found, then at 107 user permissions are retrieved. If there is no valid sub-session cookie, then the framework calls the servlet to generate a new or fresh sub-session cookie based on the primary session. To do this the servlet returns to 102 to check the validity of the primary session.

If the user's permissions allow the user to access the content, then at 110, the content is downloaded to the user. On the other hand if the user's permissions do not allow access to the content, then access is refused at 109.

The above process provides several protections against latent attacks not only from uploaded user content but also from other sources. The separate domain used to serve the content, isolates the content in the separate domain from the primary domain. The separate domain serves its content seamlessly in the sense that the user does not need to re-authenticate when attempting to access the content domain. If the sub-session cookie is set when the user logs in for the primary domain session, then the user is already authenticated upon requesting content from the secondary domain. This provides a faster and easier user experience.

On the other hand, because the authentication for each domain is separate, requests for regular pages, data, or other content on the primary domain cannot be made from the content domain. Access to the primary domain is only possible after authentication specifically to the primary domain.

Accordingly, the process has protections to thwart the use of the content domain sub-session to request content from the primary domain. By using a separate domain for serving user uploaded content, any malicious scripts in the content can be prevented from accessing valuable information on the primary domain. In the same way, there are protections to thwart the use of a primary domain session to request content from the content domain.

The system may be equipped with additional features to enhance security and convenience. For example, the framework may include a domain redirect filter. The content on the secondary domain can be analyzed and classified as high and low risk. The low risk content can be whitelisted. A domain redirect filter may be used to intercept requests made to the content domain to ensure that only whitelisted content can be served from the content domain. Request for other data can be redirected to an access denied report. The domain redirect filter can also be used to prevent user requests from the primary domain without authorization on the primary domain. These requests can be redirected to a primary domain login page.

The framework can also be configured to provide session decoding checks. The framework can be provided with checks in the session decoding logic to detect the presence of active and valid sessions and sub sessions as necessary for each request. Checking for an active valid session whenever a request is made on a particular one of the domains, helps to prevent a session on one domain from being used to access the other domain.

The framework can also include a "ContentDoor" as a sub-session cookie pre-setting mechanism for the secondary domain. When a page is loaded for the first time after logging in to the primary domain through an application, the framework may be asked to serve a large number of user uploaded images from the content domain. This may occur, for example when an initial screen presents a variety of profiles to select from and many of the profiles include profile pictures from the content domain. Modern browsers parallelize the requests for images and other media that all come from the same secondary domain. The parallelized requests cause multiple redirections from the primary domain to the secondary domain in a short amount of time. If a session cookie for the content domain has not been set or has become stale, then there can be an extra database server load as the system tries to build a child sub-session for the content domain.

By presetting a session cookie for the content domain when the user logs in. The child sub-session cookie is already available. In the described examples, a "ContentDoor" is used. In one example, the "ContentDoor" is a page on the content domain whose primary purpose is just to receive a session meant for the content domain and to set a cookie for the same. After setting the cookie, the ContentDoor redirects the user back to the primary domain to resume the user's login flow.

System Description

Figure 2:
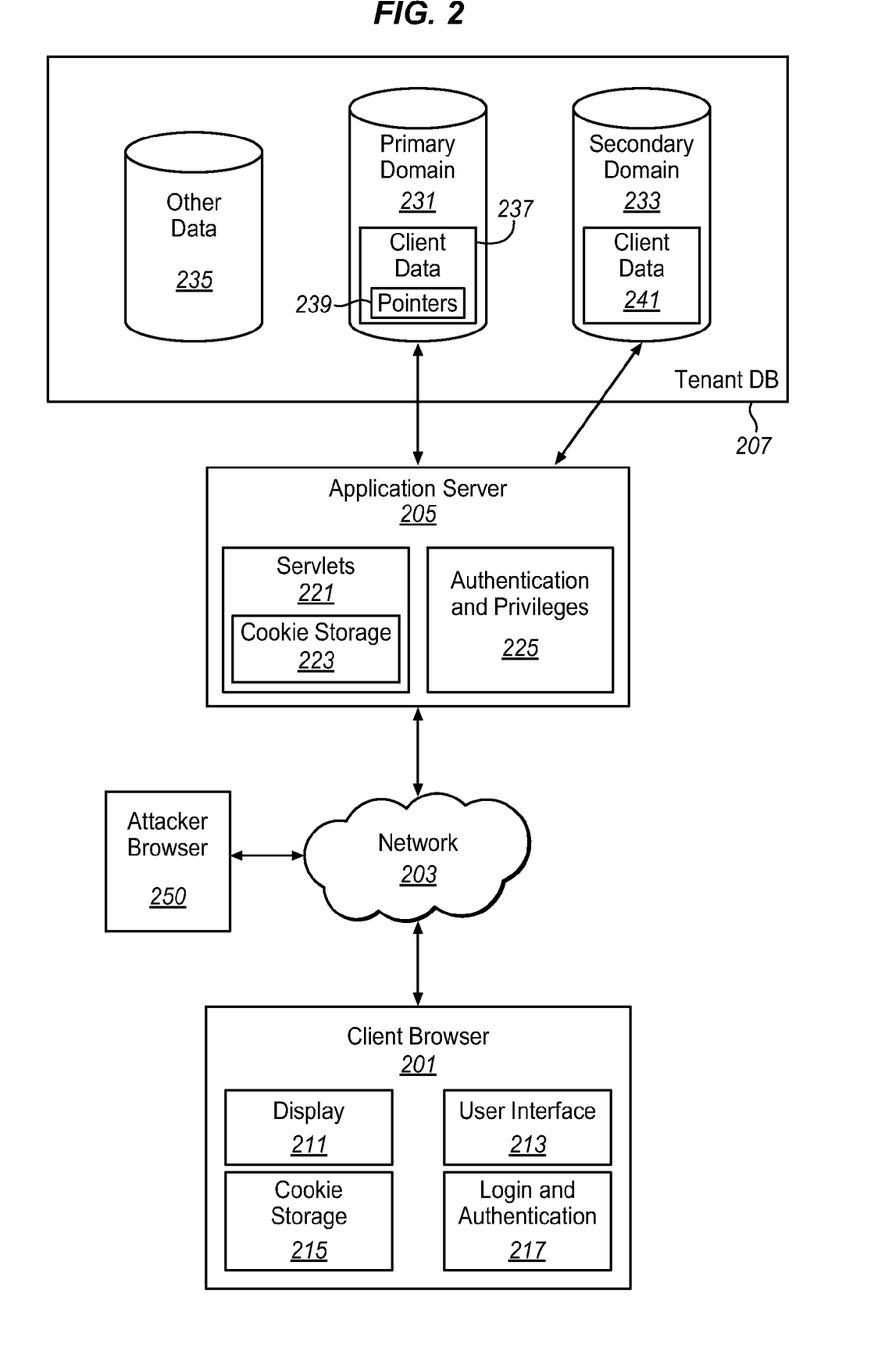
FIG. 2 illustrates a representative system for protecting against attacks from outside content in an embodiment.

FIG. 2 illustrates a simplified block diagram of a content delivery system. A customer, user, or client has a user terminal which may be fixed or mobile, that supports a client terminal interface 201. In the illustrated example, the interface is a generic web browser, however, a specialized application may be used instead of a web browser depending on the particular implementation. Using the web browser or other interface, the user may upload and download content from a remote database and from many different locations.

The client browser 201 is connected through the cloud 203 or through a local area, metropolitan area, or wide area network to an application server 205. The application server serves applications to the client browser through the cloud to provide access to a tenant database 207. While in the present example, the tenant database is a multi-tenant database, the database may be for a single tenant or for one or more entities within a greater structural umbrella.

Within the client browser, in addition to a display 211, and a user interface 213, there is a cookie storage area 215 and a login and authentication module 217. The cookie storage works with the authentication to track sessions and store authentication credentials for the user, as described above.

The application server includes applets and servlets 221 in addition to applications. As mentioned above, a sub-session authentication servlet includes cookie storage 223 or access to cookie storage. As explained above, these cookies are used for tracking authentication to the primary and any secondary sessions. The servlet can generate, request, and store cookies which are provided through the cloud 203 to the client browser. The application server also includes authentication and privileges 225 coupled to the servlet and cookie storage to track credentials and privileges for each of its users. The application server acts as an interface between the client browser and the tenant databases 207.

The tenant databases include a database 231 for the primary domain, a database 233 for the secondary domain and additional databases 235 for other domains, other tenants, and other data shown as a single third database, however, there may be many databases to provide these additional components to the system. While the tenant database 207 is shown as being constructed from multiple databases, there may be a single database with all of the data separated into multiple domains.

In the illustrated example, the database 231 for the primary domain, or alternatively, the portion of the single database that corresponds to the primary domain contains client data 237 which the client can access through the client browser 201 and pointers 239 to content in one or more other domains. The database 233 for the secondary domain contain client data 241 indicated by the pointers in the primary domain.

As described above, the client begins by seeking information from the primary domain, but uploaded content and other content, depending on the particular implementation, is referenced only by pointers 239 to another domain. If the pointers point to content 241 in the secondary domain 233, then the application will attempt to obtain the indicated content from the secondary domain. Because this data is in a different domain, the client must have a valid session with the secondary domain and the application refers to its authentication and cookie storage to provide this using, for example, the approach described in the context of FIG. 1.

An attacker 250 is also shown coupled to the application server 205 through the cloud 203. The attacker seeks to gain access to either one of the domains of the tenant dB 207 using any credentials that the attacker can find or through a back door. After obtaining access, the attacker can then upload dangerous content into either of the domains. The dangerous content may be concealed within image files, embedded macros or in other ways. The attacker may be a user that intentionally seeks to compromise the system or other users, however, the attacker may also be an innocent user with a corrupted client system or an outsider that has accessed the system unintentionally.

In the system described above, the attacker is frustrated without having an authentication to access the primary domain. Since the secondary domain also requires a current authorization to access the primary domain, even the secondary domain cannot be accessed.

Figure 3:
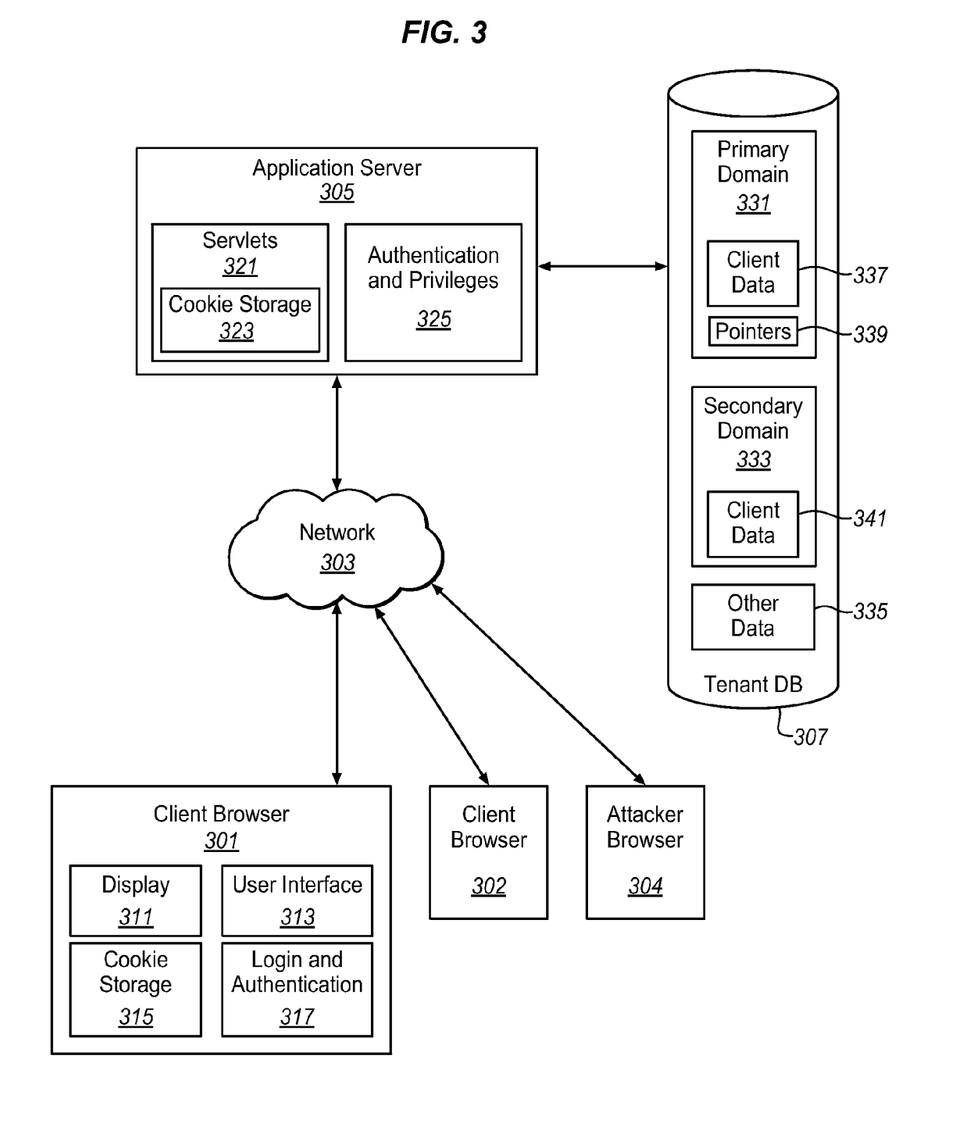
FIG. 3 illustrates a representative system for protecting against attacks from outside content in another embodiment.

FIG. 3 illustrates a simplified block diagram of an alternative content delivery system. A first client terminal interface 301 has access to the cloud 303. Additional client browsers 302, 304 also have access to the cloud. While three are shown, there may be many thousands or more. One or more of the client browsers may be that of an attacker. The cloud 303 represents any number of direct or indirect, wired or wireless connections.

The cloud provides access to an application server 305 which serves applications to the client browsers through the cloud to provide access to a tenant database 307. In the present example, the tenant database is a single multi-tenant database which contains data stored for multiple users using multiple domains.

Within the client browsers, in addition to a display 311, and a user interface 313, there is a cookie storage area 315 and a login and authentication module 317. The cookie storage works with the authentication to track sessions and store authentication credentials for the user, as described above.

The application server, as in the above examples, includes applications, applets and servlets 321. A servlet may include cookie storage 323 or access to cookie storage to track authentication to the primary and secondary domains. Authentication and privileges 325 may be coupled to the servlet and cookie storage or may be located in another location, such as the tenant database 307.

The tenant databases has a single database with multiple domains, a primary domain 331, a secondary domain 333 and additional domains 335 for other data, other tenants. There may be many additional domains (not shown) for additional purposes not described herein.

In the illustrated example, the primary domain contains client data 337 which the client can access through the client browser 301. It also contains pointers 339 to content in the secondary domain 333, such as additional client data 341. As described above, the client begins by seeking information from the primary domain, but uploaded content and other content, depending on the particular implementation, is referenced only by pointers 339 to the secondary domain. This data will be accessed using a valid session with the secondary domain, which in the examples above, is a sub-session of a valid session on the primary domain 331.

System Overview

Figure 4:
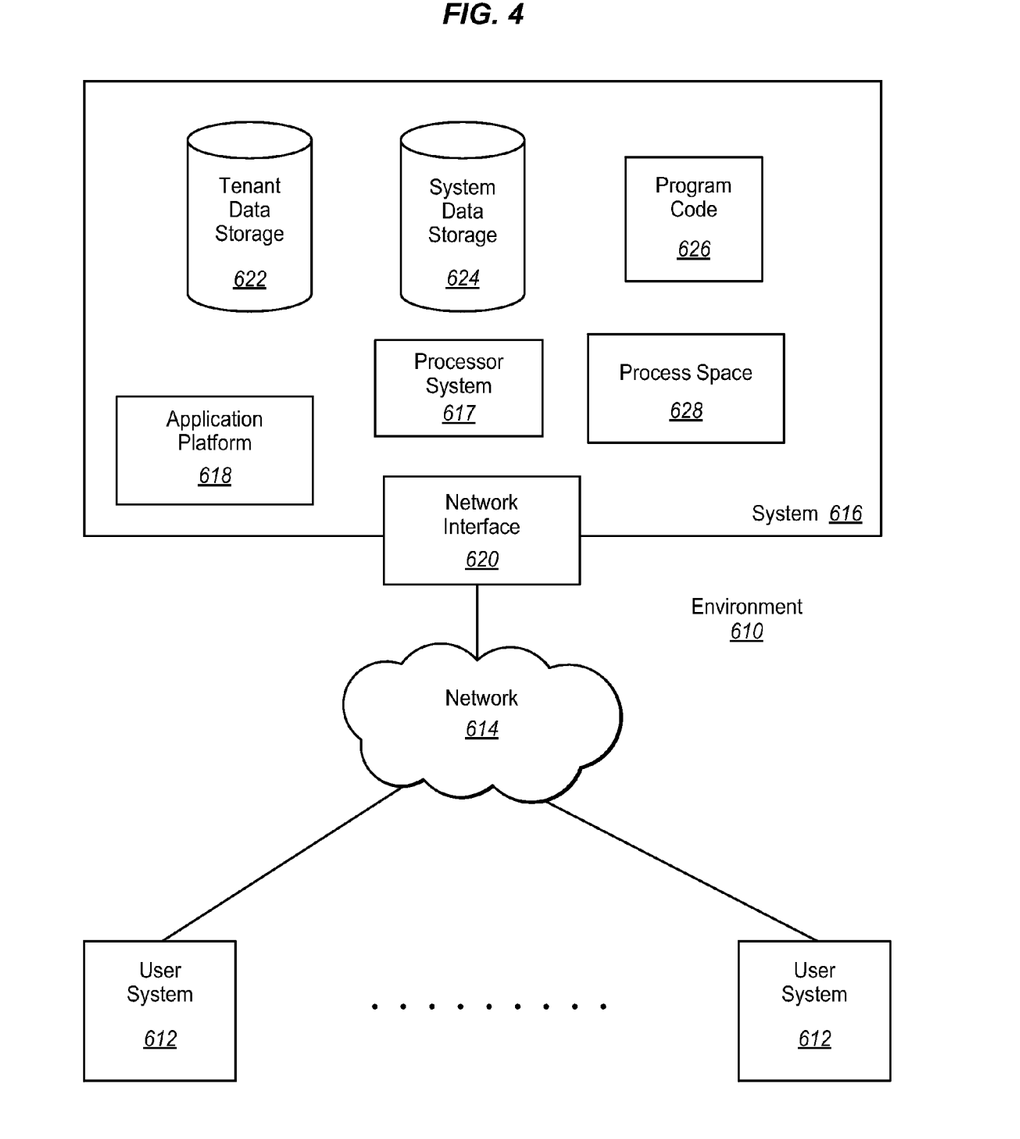
FIG. 4 illustrates a block diagram of an example of an environment wherein an on-demand database service might be used.

FIG. 4 illustrates a block diagram of an environment 610 wherein an on-demand database service might be used. Environment 10 may include user systems 612, network 614, system 616, processor system 617, application platform 18, network interface 620, tenant data storage 622, system data storage 624, program code 626, and process space 628. In other embodiments, environment 10 may not have all of the components listed and/or may have other elements instead of, or in addition to, those listed above.

Environment 610 is an environment in which an on-demand database service exists. User system 612 may be any machine or system that is used by a user to access a database user system. For example, any of user systems 612 can be a handheld computing device, a mobile phone, a laptop computer, a work station, and/or a network of computing devices. As illustrated in FIG. 4 (and in more detail in FIG. 5) user systems 612 might interact via a network 614 with an on-demand database service, which is system 616.

An on-demand database service, such as system 616, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 616" and "system 616" will be used interchangeably herein. A database image may include one or more database objects. A relational database management system (RDMS) or the equivalent may execute storage and retrieval of information against the database object(s). Application platform 618 may be a framework that allows the applications of system 616 to run, such as the hardware and/or software, e.g., the operating system. In an embodiment, on-demand database service 16 may include an application platform 18 that enables creation, managing and executing one or more applications developed by the provider of the on-demand database service, users accessing the on-demand database service via user systems 612, or third party application developers accessing the on-demand database service via user systems 612.

The users of user systems 612 may differ in their respective capacities, and the capacity of a particular user system 612 might be entirely determined by permissions (permission levels) for the current user. For example, where a salesperson is using a particular user system 612 to interact with system 616, that user system has the capacities allotted to that salesperson. However, while an administrator is using that user system to interact with system 616, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 614 is any network or combination of networks of devices that communicate with one another. For example, network 614 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 612 might communicate with system 616 using TCP/IP and, at a higher network level, use other common Internet protocols to communicate, such as HTTP, FTP, AFS, WAP, etc. In an example where HTTP is used, user system 612 might include an HTTP client commonly referred to as a "browser" for sending and receiving HTTP messages to and from an HTTP server at system 616. Such an HTTP server might be implemented as the sole network interface between system 616 and network 614, but other techniques might be used as well or instead. In some implementations, the interface between system 616 and network 614 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 616, shown in FIG. 4, implements a web-based customer relationship management (CRM) system. For example, in one embodiment, system 616 includes application servers configured to implement and execute CRM software applications as well as provide related data, code, forms, webpages and other information to and from user systems 612 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 616 implements applications other than, or in addition to, a CRM application. For example, system 16 may provide tenant access to multiple hosted (standard and custom) applications, including a CRM application. User (or third party developer) applications, which may or may not include CRM, may be supported by the application platform 618, which manages creation, storage of the applications into one or more database objects and executing of the applications in a virtual machine in the process space of the system 616.

One arrangement for elements of system 616 is shown in FIG. 4, including a network interface 620, application platform 618, tenant data storage 622 for tenant data 623, system data storage 624 for system data 625 accessible to system 616 and possibly multiple tenants, program code 626 for implementing various functions of system 616, and a process space 628 for executing MTS system processes and tenant-specific processes, such as running applications as part of an application hosting service. Additional processes that may execute on system 616 include database indexing processes.

Several elements in the system shown in FIG. 4 include conventional, well-known elements that are explained only briefly here. For example, each user system 612 could include a desktop personal computer, workstation, laptop, PDA, cell phone, or any wireless access protocol (WAP) enabled device or any other computing device capable of interfacing directly or indirectly to the Internet or other network connection. User system 612 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 612 to access, process and view information, pages and applications available to it from system 616 over network 614. Each user system 612 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 616 or other systems or servers. For example, the user interface device can be used to access data and applications hosted by system 616, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 612 and all of its components are operator configurable using applications, such as a browser, including computer code run using a central processing unit such as an Intel Pentium® processor or the like. Similarly, system 616 (and additional instances of an MTS, where more than one is present) and all of their components might be operator configurable using application(s) including computer code to run using a central processing unit such as processor system 617, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 16 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 616 is configured to provide webpages, forms, applications, data and media content to user (client) systems 612 to support the access by user systems 612 as tenants of system 616. As such, system 616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 5:
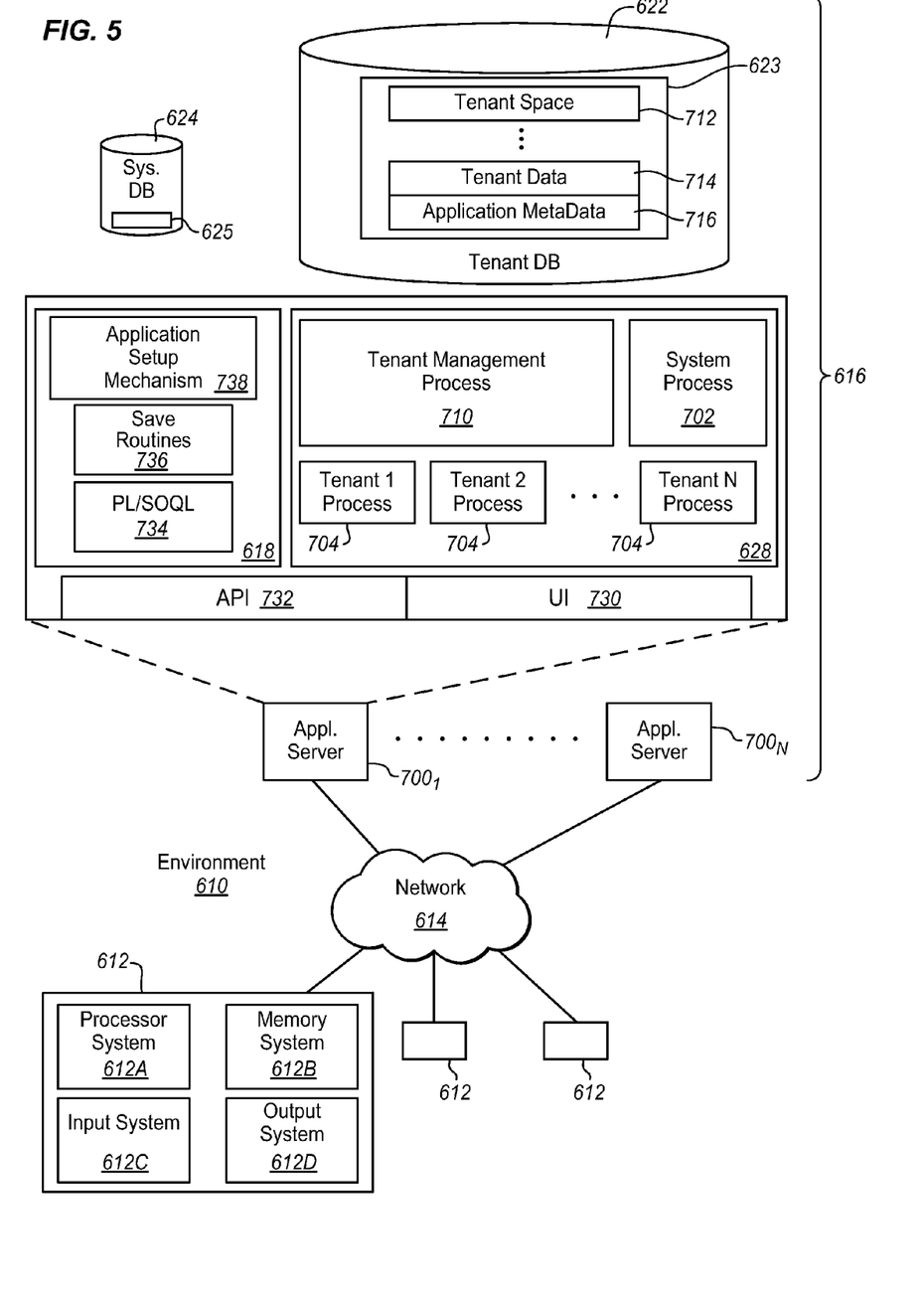
FIG. 5 illustrates a block diagram of an embodiment of elements of FIG. 6 and various possible interconnections between these elements.

FIG. 5 also illustrates environment 610. However, in FIG. 5 elements of system 616 and various interconnections in an embodiment are further illustrated. FIG. 5 shows that user system 612 may include processor system 612A, memory system 612B, input system 612C, and output system 612D. FIG. 5 shows network 614 and system 616. FIG. 5 also shows that system 616 may include tenant data storage 622, tenant data 623, system data storage 624, system data 625, User Interface (UI) 730, Application Program Interface (API) 732, PL/SOQL 734, save routines 736, application setup mechanism 738, applications servers $1000_1$-$1000_N$, system process space 702, tenant process spaces 704, tenant management process space 710, tenant storage area 712, user storage 714, and application metadata 716. In other embodiments, environment 610 may not have the same elements as those listed above and/or may have other elements instead of, or in addition to, those listed above.

User system 612, network 614, system 616, tenant data storage 622, and system data storage 624 were discussed above in FIG. 4. Regarding user system 612, processor system 612A may be any combination of one or more processors. Memory system 612B may be any combination of one or more memory devices, short term, and/or long term memory. Input system 612C may be any combination of input devices, such as one or more keyboards, mice, trackballs, scanners, cameras, and/or interfaces to networks. Output system 612D may be any combination of output devices, such as one or more monitors, printers, and/or interfaces to networks. As shown by FIG. 5, system 616 may include a network interface 620 (of FIG. 4) implemented as a set of HTTP application servers 700, an application platform 618, tenant data storage 622, and system data storage 624. Also shown is system process space 702, including individual tenant process spaces 704 and a tenant management process space 710. Each application server 1000 may be configured to tenant data storage 622 and the tenant data 623 therein, and system data storage 624 and the system data 625 therein to serve requests of user systems 612. The tenant data 623 might be divided into individual tenant storage areas 712, which can be either a physical arrangement and/or a logical arrangement of data. Within each tenant storage area 712, user storage 714 and application metadata 716 might be similarly allocated for each user. For example, a copy of a user's most recently used (MRU) items might be stored to user storage 714. Similarly, a copy of MRU items for an entire organization that is a tenant might be stored to tenant storage area 712. A UI 730 provides a user interface and an API 732 provides an application programmer interface to system 616 resident processes to users and/or developers at user systems 612. The tenant data and the system data may be stored in various databases, such as one or more Oracle™ databases.

Application platform 618 includes an application setup mechanism 738 that supports application developers' creation and management of applications, which may be saved as metadata into tenant data storage 622 by save routines 736 for execution by subscribers as one or more tenant process spaces 704 managed by tenant management process 710 for example. Invocations to such applications may be coded using PL/SOQL 34 that provides a programming language style interface extension to API 732. A detailed description of some PL/SOQL language embodiments is discussed in commonly owned co-pending U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 716 for the subscriber making the invocation and executing the metadata as an application in a virtual machine.

Each application server 700 may be communicably coupled to database systems, e.g., having access to system data 625 and tenant data 623, via a different network connection. For example, one application server $700_1$ might be coupled via the network 614 (e.g., the Internet), another application server $700_{N-1}$ might be coupled via a direct network link, and another application server $700_N$ might be coupled by yet a different network connection. Transfer Control Protocol and Internet Protocol (TCP/IP) are typical protocols for communicating between application servers 700 and the database system. However, it will be apparent to one skilled in the art that other transport protocols may be used to optimize the system depending on the network interconnect used.

In certain embodiments, each application server 700 is configured to handle requests for any user associated with any organization that is a tenant. Because it is desirable to be able to add and remove application servers from the server pool at any time for any reason, there is preferably no server affinity for a user and/or organization to a specific application server 700. In one embodiment, therefore, an interface system implementing a load balancing function (e.g., an F5 Big-IP load balancer) is communicably coupled between the application servers 700 and the user systems 612 to distribute requests to the application servers 700. In one embodiment, the load balancer uses a least connections algorithm to route user requests to the application servers 700. Other examples of load balancing algorithms, such as round robin and observed response time, also can be used. For example, in certain embodiments, three consecutive requests from the same user could hit three different application servers 700, and three requests from different users could hit the same application server 700. In this manner, system 616 is multi-tenant, wherein system 616 handles storage of, and access to, different objects, data and applications across disparate users and organizations.

As an example of storage, one tenant might be a company that employs a sales force where each salesperson uses system 616 to manage their sales process. Thus, a user might maintain contact data, leads data, customer follow-up data, performance data, goals and progress data, etc., all applicable to that user's personal sales process (e.g., in tenant data storage 622). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 616 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 616 might also maintain system level data usable by multiple tenants or other data. Such system level data might include industry reports, news, postings, and the like that are sharable among tenants.

In certain embodiments, user systems 612 (which may be client systems) communicate with application servers 700 to request and update system-level and tenant-level data from system 616 that may require sending one or more queries to tenant data storage 622 and/or system data storage 624. System 616 (e.g., an application server 700 in system 616) automatically generates one or more SQL statements (e.g., one or more SQL queries) that are designed to access the desired information. System data storage 624 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method comprising:
    receiving an authentication of a user to a first domain by an application server, the application server being a computing system connected to the first domain and a second domain;
    establishing a first active session for the user with the first domain by the application server based on the authentication;

receiving a request from the user to access content from the second domain at the application server after establishing the first active session;

searching for a second active session for the user with the second domain;

if no second active session with the second domain is found, then determining whether the first session with the first domain is active;

if the first active session with the first domain is found, then establishing a sub-session with the second domain based on and dependent upon the active session with the first domain by the application server; and providing the requested content through the application server to the user based on the established sub-session with the second domain.

2. The method of claim 1, wherein establishing a sub-session comprises establishing a child session.

3. The method of claim 1, wherein searching for an active session comprises searching for a valid session cookie.

4. The method of claim 1, further comprising retrieving permissions of the user on the second domain and wherein providing the requested content comprises providing the requested content if the content is allowed by the retrieved permissions.

5. The method of claim 4, wherein retrieving permissions comprises retrieving permissions only if there is an active session with the second domain.

6. The method of claim 1, wherein the second domain contains content uploaded from users other than the user and a system administrator.

7. The method of claim 1, wherein the second domain contains content, available to authenticated users, that is not available on the first domain.

8. An apparatus comprising:

an application server in the form of a hardware computing system coupled to a first and a second database in first and second domains, respectively, to receive an authentication of a user to the first domain, to establish a first active session for a user with the first domain based on the authentication, to receive a request from the user to access content from the second domain after establishing the first active session, the application server having a servlet to search for a second active session for the user with the second domain, if no second active session is found, then to determine whether the first session with the first domain is active, and if an active first session is found with the first domain, then to establish a sub-session with the second domain based on and dependent upon the active first session with the first domain, the application server to provide the requested content to the user based on the established sub-session with the second domain.

9. The apparatus of claim 8, wherein the servlet comprises a cookie storage to store cookies for valid sessions with the first and second domains.

10. The apparatus of claim 8, further comprising a permissions storage and wherein the application server retrieves permissions of the user on the second domain from the permissions storage and provides the requested content if the content is allowed by the retrieved permissions.

11. The apparatus of claim 8, wherein the first domain comprises content accessible to users and pointers to content in the second domain.

12. The apparatus of claim 11, wherein the second domain content comprises content that is not available on the first domain.

13. A non-transitory machine-readable medium carrying one or more sequences of instructions for providing content of a second domain from a first domain, which instructions, when executed by one or more processors, cause the one or more processors to carry out the steps of:

receiving an authentication of a user to the first domain;

establishing a first active session for the user with the first domain by an application server, the application server being a computing system connected to the first domain and a second domain;

receiving a request from the user to access content from the second domain at the application server after establishing the first active session;

searching for a second active session for the user with the second domain;

if no second active session is found with the second domain, then determining whether the first session with the first domain is active;

if the first active session with the first domain is found, then establishing a sub-session with the second domain based on and dependent upon the active session with the first domain by the application server; and providing the requested content through the application server to the user based on the established sub-session with the second domain.

14. The machine-readable medium of claim 13, the second domain session comprises a child session.

15. The machine-readable medium of claim 13, wherein the second domain contains content uploaded from users other than the user and a system administrator.

16. An apparatus for providing content of a second domain from a first domain, the apparatus comprising:

a hardware processor; and one or more stored sequences of instructions which, when executed by the processor, cause the processor to carry out the steps of:

receiving an authentication of a user to a first domain by an application server, the application server being a computing system connected to the first domain and a second domain;

establishing a first active session for the user with the first domain by the application server based on the authentication;

receiving a request from the user to access content from the second domain at the application server after establishing the first active session;

searching for a second active session for the user with the second domain;

if no second active session with the second domain is found, then determining whether the first session with the first domain is active;

if the first active session with the first domain is found, then establishing a sub-session with the second domain based on and dependent upon the active session with the first domain by the application server; and providing the requested content through the application server to the user based on the established sub-session with the second domain.

17. The apparatus of claim 16, wherein the steps further comprise retrieving permissions of the user on the second domain only if there is an active session with the second domain and wherein providing the requested content comprises providing the requested content if the content is allowed by the retrieved permissions.

* * * * *